Patented June 17, 1941

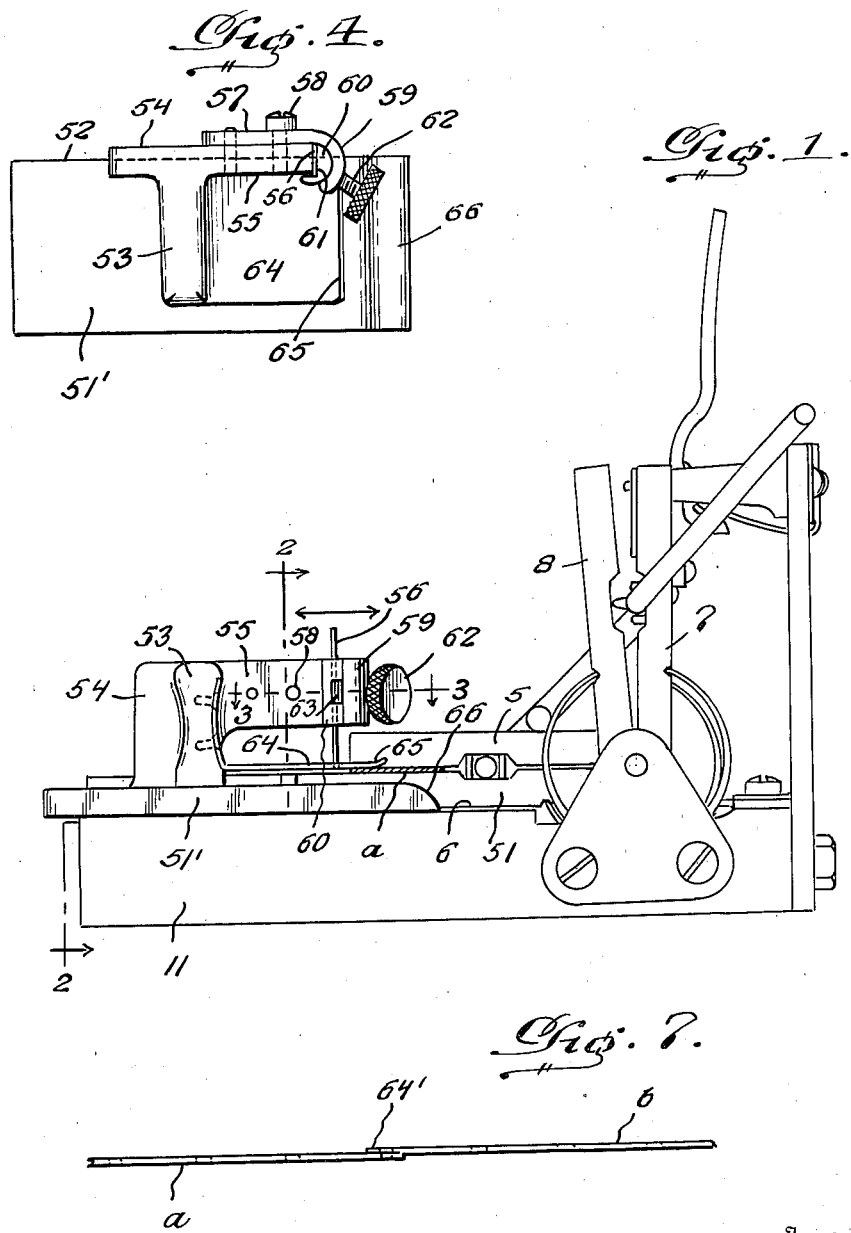

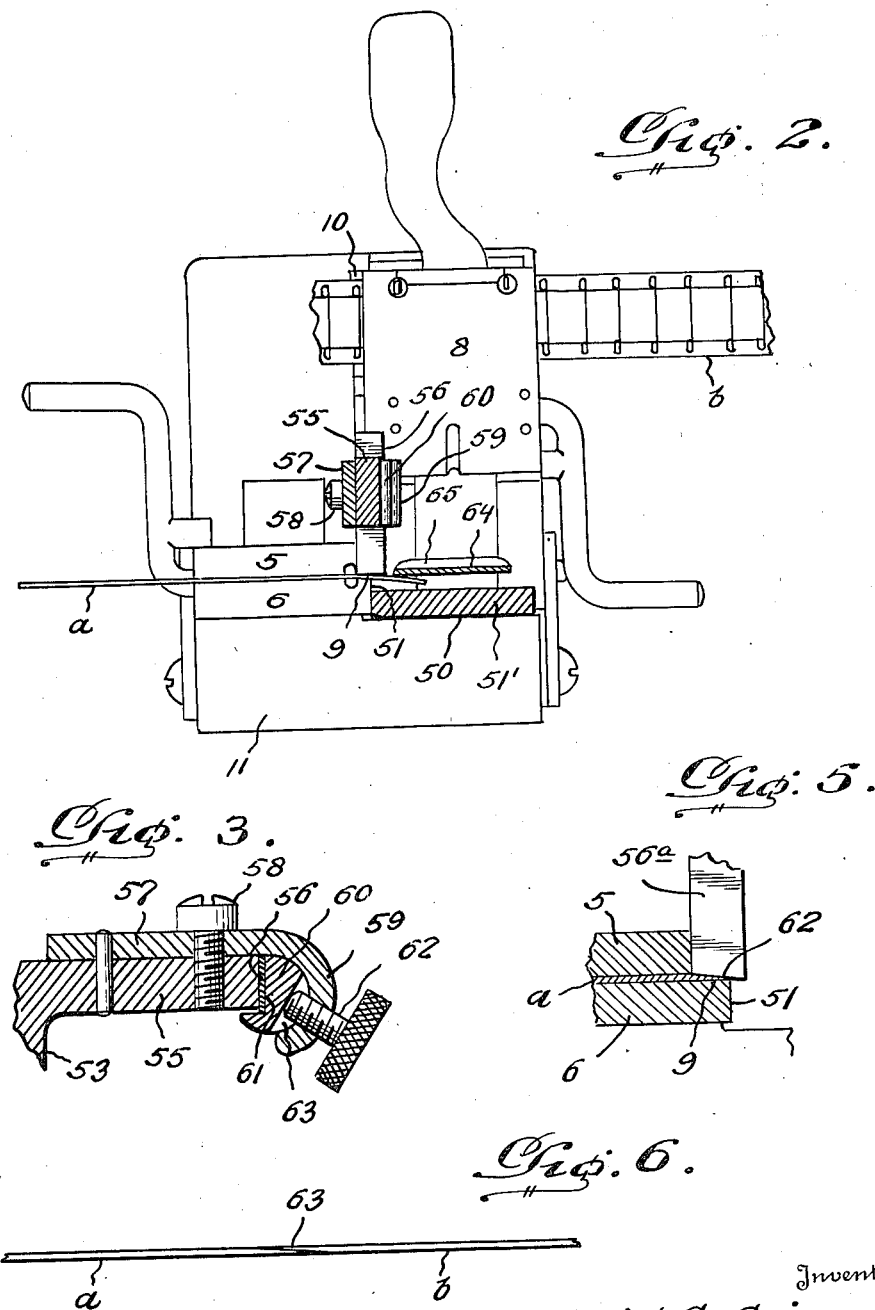

2,245,976

UNITED STATES PATENT OFFICE 2,245,976

FILM SCRAPING DEVICE

Frederick C. Griswold, Port Jefferson, N. Y.

Original application February 28, 1940, Serial No. 321,311. Divided and this application September 25, 1940, Serial No. 358,365

5 Claims. (Cl. 30—169)

The present invention relates to film splicing devices, and has more particular reference to an improved device for scraping the film where the splice is to be made, so as to remove the emulsion from the film as required in making an efficient splice.

The present application is a division of my co-pending application for U. S. Letters Patent for Film splicing devices, Serial Number 321,311, and an object of the present invention is to provide a film scraper having guiding surfaces adapted to co-act with guiding surfaces of a splicing device proper of the type disclosed in my above-mentioned co-pending application, whereby the scraper is effectively guided as it is reciprocated to scrape the film.

Another object of the present invention is to provide a film scraping device having means to depress the projecting end of the film as it is being scraped, thereby maintaining the scraped portion of the film against a shoulder while it is being acted upon by the blade of the scraping device.

Still another object of the present invention is to provide simple and efficient means for clamping the scraper blade in place.

A further object of the present invention is to provide a film scraping device which is simple and durable in construction, economical to manufacture, convenient to use, and efficient in operation.

The present invention consists in the novel form, combination and arrangement of parts hereinafter more fully described, shown in the accompanying drawings and claimed.

In the drawings:

Figure 1 is a side elevational view showing a film scraper constructed in accordance with the present invention and disposed in position upon a film splicing device proper so that reciprocation of the scraper will cause removal of the emulsion from one portion of the film strip where a splice is to be made.

Figure 2 is a vertical transverse section on line 2—2 of Figure 1.

Figure 3 is an enlarged fragmentary horizontal section taken on line 3—3 of Figure 1.

Figure 4 is a top plan view of the scraper shown in Figure 1.

Figure 5 is a detailed view partly in section and partly in elevation illustrating a modified form of scraper blade which is employed when a bevel form of splice is to be made.

Figure 6 is an edge elevational view showing film strip portions having a beveled joint or splice as produced by use of the blade shown in Figure 5; and Figure 7 is a view similar to Figure 6 showing the portions of a film strip having a lap joint or splice such as is produced by the use of a blade of the type shown in Figures 1 and 2.

The present film scraping device is particularly adapted for use in connection with a splicing device proper of the type shown in my above-mentioned co-pending application, wherein two film clamps are provided, each comprising a pair of coacting clamping jaws adapted to receive and hold a portion of the film to be spliced. In this type of splicing device, one clamp comprises upper and lower jaws or jaw plates 5 and 6 that are adapted to receive the portion $a$ of the film, and the other clamp comprises similar upper and lower jaws or jaw plates 7 and 8 that are adapted to receive the portion $b$ of the film, the end of the portion $b$ being adapted to be superimposed upon the end of the portion $a$ when the splice is made. As shown clearly in Figures 2 and 5, the jaw 5 is narrower than the jaw 6, thereby providing an extended shoulder or shelf 9 at the inner side of this clamp upon which a part of the film portion $a$ rests with its upper surface exposed. In a like manner, the jaw 8 is narrower than the jaw 7 so as to provide an extended shelf or shoulder 10 at the inner side of the clamp composed of jaws 7 and 8, against which shoulder 10 a part of the film portion $b$ is disposed with its lower surface exposed. The arrangement is such that when the clamp composed of jaws 7 and 8 is swung forwardly and downwardly, the jaws of the two clamps cooperate to shear the extended ends of the film portions, leaving narrow end portions on the shoulders 9 and 10 which will overlap a predetermined distance and will be pressed together when the forward and downward swinging movement of the clamp 7, 8 is completed. By scraping the emulsion from the upper surface of the end of film portion $a$ disposed on shoulder 9, and then applying cement to this scraped surface, it will be apparent that the joint or splice will be made as the ends of the film portions are sheared and the ends thereof remaining on the shoulders 9 and 10 are pressed together, pursuant to the forward and downward swinging movement of the clamp 7, 8. The film splicing device proper also embodies a horizontal base or base plate 11, preferably of elongated rectangular form and of a width equal to the combined widths of the two film clamps, which are mounted on said base in side by side relation. The base 11 has a flat upper surface portion 50 beside the stationary clamp 5, 6, and the lower jaw 6 of the stationary clamp is extended forwardly beyond the upper jaw 5 to the forward end of the base 11 and has a straight flat inner edge 51. Other details and features of the splicing device proper are clearly described in my above-mentioned co-pending application, and need not be further described herein.

The scraper constituting the present invention is adapted to operate upon a part of the film portion *a* which rests upon the shoulder 9 while said film portion *a* is clamped between the jaws 5 and 6 and so as to remove the emulsion therefrom. This is done while the film portion *b* is held between the jaws 7 and 8 of the swinging clamp and while the latter is in its upwardly and rearwardly swung position as shown more clearly in Figures 1 and 2, the jaws 7 and 8 being closed instead of being open as shown in Figure 1. The scraper comprises a horizontal plate-like base 51' having a flat bottom surface adapted to flatly engage the upper flat guiding surface 50 of the base 11. Also, the base 51' of the scraper is provided along one side with a flat edge 52 arranged to simultaneously engage the flat inner guiding edge 51 of the lower jaw 6 of the stationary clamp. Rigid with and rising from the base 51' is a transverse member 53 adapted to form a handle which may be gripped for reciprocating the scraper, and at the inner side of this member 52 is a rigid plate-like part 54 having a forwardly projecting portion or arm 55 which is spaced above and extends outwardly beyond the side edge 52 of the base 51' as will be apparent from an inspection of Figure 2. This forwardly projecting portion or arm 55 has a vertical flat front edge against which is adapted to be disposed the scraper blade 56 consisting of a thin flexible elongated strip of metal having end cutting edges. Means is provided to tightly clamp the blade 56 in place against the end edge of the portion or arm 55, which means consists of a clamping member 57 bolted or otherwise secured as at 58 to the projecting arm 55 and having an inwardly directed curved forward end portion 59 disposed in spaced relation to and forwardly of the forward edge of arm 55. A clamping block 60 of elongated form is disposed between the curved portion 59 and the forward end of arm 55, and this clamping block has a rounded side fitting the curved portion 59 of the clamping member 57. Also, the block 60 has a rabbeted portion 61 arranged to engage the front face of the blade 56 and the inner edge of the latter. Thus, when the block 60 is forced toward the forward end of the arm 55 and laterally and inwardly relative to the latter, the blade 56 will be firmly clamped against the end edge of said arm 55 and tightly held between the member 57 and the flanged side of the block 60. In this way, the blade 56 will be firmly held against any movement and in a truly vertical position so that the lower edge of the blade will be absolutely parallel with the film portion to be scraped. The part of the blade 56 projecting below the arm 55 will be freely flexible so that it may yield in opposite directions as the scraper is reciprocated, in a manner generally well known in the art. This insures free movement of the scraper and an efficient scraping action. Means is provided for forcing the clamping block 60 toward the forward end of the arm 55 and laterally and inwardly relative to the same so as to effect the firm clamping of the blade in place, which means may consist of a set screw 62 threaded at an angle through the curved portion 59 of the clamping plate 57 and engaging in a transverse angularly disposed groove 63 provided in the clamping block 60 as shown more clearly in Figure 3. The latter arrangement provides for holding the block 60 in place or against vertical displacement while it is being tightened or when it is loosened.

It is important to maintain the projecting end of the film portion *a* depressed while the part on the shoulder 9 is being scraped. For this purpose, I provide a horizontal guard plate 64 which projects forwardly from the handle member 53 and extends at the outer side of the blade 56 as well as forwardly of the latter, with its forward end upturned as at 65. In this way, the projecting end of the film portion *a* is guided under the guard plate 64 so as to be depressed below the plane of the shoulder 9 while the scraping blade 56 is operating on the part of the film resting on said shoulder 9. As the blade 56 is held in a position with its lower edge outwardly of the inner edge of the base 51', it is properly positioned to engage the part of the film resting on the shoulder 9, when the scraper is reciprocated in contact with the guiding surface 50 and guiding edge 51. The forward end of base 51' of the scraper is preferably beveled forwardly and downwardly as at 66 so that it will ride under the projecting end of the film portion *a* even though the same is depressed by the guard plate 64.

In operation, the swinging clamp is swung upwardly and rearwardly, after which the film portions to be spliced are clamped between the jaws of the respective clamps. The part of the film portion *a* which rests on the shoulder 9 is then scraped to remove the emulsion therefrom, after which cement is applied to this scraped part. The swinging clamp is then lowered so as to shear the projecting ends of the film portions and to press together the overlapping ends of the film portions which remain between the shoulders 9 and 10. It will of course be understood that the splicing operation described will effect an ordinary lap joint or splice in connection with a film having emulsion only on one surface thereof, as indicated at 64' in Figure 7. To do this, the film portion *a* must be disposed with its emulsion surface uppermost and the film portion *b* must be disposed with its emulsion surface disposed rearwardly with respect to the swinging clamp when the latter is in raised position.

It is sometimes necessary to splice a film having emulsion on both surfaces thereof, or to scrape both film portions in order to produce a beveled joint or splice of no greater thickness than the thickness of the film itself, as indicated at 63 in Figure 6. Under such circumstances, it is necessary to modify the film splicing device proper as illustrated in my above-mentioned co-pending application, whereby the scraper may be utilized to scrape the part of the film portion *b* engaging the shoulder 10 of the jaw 7 of the swinging clamp. Under these conditions, it is necessary to scrape the projecting ends of both film portions and to bevel such ends so as to produce a thin beveled joint or splice 63. The manner in which the ends of film portions are beveled to bring this about is generally well known in the art, and the only change required in forming such a splice is to provide the scraper blade 56a with a laterally inclined lower scraping edge as indicated at 62 in Figure 5.

It will be noted that the scraper is of very simple construction embodying a base merely provided with a flat under supporting surface and a flat side guiding edge. Inward and downward pressure on the scraper is all that is needed while being operated, and elaborate guideways or guide ribs on the splicing device or the scraper are unnecessary. Also, the relation is such that the scraping blade does not protrude below the base of the scraper, and a very compact and durable construction of scraper is possible.

It is believed the construction and operation, as well as the advantages of the present invention will be readily understood and appreciated by those skilled in the art. Minor changes in the details of construction illustrated and described are contemplated within the scope and spirit of the invention as claimed.

What I claim as new is:

1. In a film splicing device, a film scraper comprising a base having a flat under surface and provided along one side with a straight edge, a member rising from said base and having a projecting arm parallel with said straight edge and overhanging said base, and means carried by an end of said arm for clamping a scraping blade in a vertical position with its lower edge disposed outwardly beyond said straight side edge of the base and above the upper surface of said base.

2. In a film splicing device, a film scraper comprising a base having a flat under surface and provided along one side with a straight edge, a member rising from said base and having a projecting arm parallel with said straight edge and overhanging said base, means carried by an end of said arm for clamping a scraping blade in a vertical position with its lower edge disposed outwardly beyond said straight side edge of the base and above the upper surface of said base, and a horizontal guard plate disposed above the base and below said arm in position to depress the projecting end portion of the film to be scraped below the level of the lower edge of the blade.

3. In a film splicing device, a film scraper comprising a base having a flat under surface and provided along one side with a straight edge, a member rising from said base and having a projecting arm parallel with said straight edge and overhanging said base, means carried by an end of said arm for clamping a scraping blade in a vertical position with its lower edge disposed outwardly beyond said straight side edge of the base and above the upper surface of said base, and a horizontal guard plate disposed above the base and below said arm in position to depress the projecting end portion of the film to be scraped below the level of the lower edge of the blade, the forward end of said base being beveled to ride under said projecting end of the film.

4. In a film splicing device, a film scraper comprising a base having a flat under surface and provided along one side with a straight edge, a member rising from said base and having a projecting arm parallel with said straight edge and overhanging said base, means carried by an end of said arm for clamping a scraping blade in a vertical position with its lower edge disposed outwardly beyond said straight side edge of the base and above the upper surface of said base, said clamping means comprising a curved jaw arranged in spaced relation to the end of said arm, a vertical block having a curved surface engaging said jaw and provided with a longitudinal rabbet to receive the blade, and means for forcing said block toward the arm so as to firmly clamp the blade at its edges and opposite faces between the block and the arm and to urge the blade outwardly of the straight edge of the base.

5. In a film splicing device, a film scraper comprising a base having a flat under surface and provided along one side with a straight edge, a member rising from said base and having a projecting arm parallel with said straight edge and overhanging said base, means carried by an end of said arm for clamping a scraping blade in a vertical position with its lower edge disposed outwardly beyond said straight side edge of the base and above the upper surface of said base, said clamping means comprising a curved jaw arranged in spaced relation to the end of said arm, a vertical block having a curved surface engaging said jaw and provided with a longitudinal rabbet to receive the blade, and means for forcing said block toward the arm so as to firmly clamp the blade at its edges and opposite faces between the block and the arm and to urge the blade outwardly of the straight edge of the base, said last-named means comprising a set screw disposed at an angle to said arm, said block having a transverse groove disposed at a corresponding angle to said arm.

FREDERICK C. GRISWOLD.